US 8,918,766 B2

(12) United States Patent
Kaler et al.

(10) Patent No.: US 8,918,766 B2
(45) Date of Patent: Dec. 23, 2014

(54) ANALYSIS OF PROPAGATED INFORMATION USING ANNOTATED FORESTS

(71) Applicant: Microsoft Corporation, Redmond, WA (US)

(72) Inventors: Christopher G. Kaler, Sammamish, WA (US); Mayila Babang, Renton, WA (US); Xin Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 13/711,622

(22) Filed: Dec. 12, 2012

(65) Prior Publication Data

US 2014/0165038 A1    Jun. 12, 2014

(51) Int. Cl.
*G06F 9/44* (2006.01)
*G06F 11/36* (2006.01)

(52) U.S. Cl.
CPC .............. *G06F 8/73* (2013.01); *G06F 11/3636* (2013.01)
USPC ............................ 717/133; 717/131; 717/132

(58) Field of Classification Search
CPC ................................ G06F 8/73; G06F 11/3636
USPC .................... 717/131–133, 156, 157
See application file for complete search history.

(56) References Cited

U.S. PATENT DOCUMENTS

| 6,857,120 | B1 * | 2/2005 | Arnold et al. .................. 717/157 |
| 7,509,632 | B2 * | 3/2009 | Boger ............................ 717/133 |
| 7,584,458 | B2 | 9/2009 | Das et al. |
| 7,610,545 | B2 | 10/2009 | Wagner et al. |
| 7,640,532 | B2 | 12/2009 | Jain et al. |
| 7,703,075 | B2 | 4/2010 | Das et al. |
| 7,703,087 | B1 * | 4/2010 | Prakash ......................... 717/157 |
| 8,336,033 | B2 * | 12/2012 | Schmelter et al. ............. 717/131 |
| 8,516,458 | B2 * | 8/2013 | Stewart et al. ................. 717/144 |
| 8,612,892 | B2 * | 12/2013 | Danton et al. ................. 715/853 |
| 2006/0218543 | A1 * | 9/2006 | Boger ............................ 717/157 |
| 2008/0244531 | A1 * | 10/2008 | Schmelter et al. ............. 717/128 |
| 2009/0222799 | A1 * | 9/2009 | Stewart et al. ................. 717/143 |
| 2009/0241128 | A1 | 9/2009 | Curbera et al. |
| 2010/0325587 | A1 * | 12/2010 | Danton et al. ................. 715/853 |

OTHER PUBLICATIONS

Rountev et al., "Static and Dynamic Analysis of Call Chains in Java," Jul. 2004, ACM, pp. 1-11.*

(Continued)

*Primary Examiner* — Qing Chen
(74) *Attorney, Agent, or Firm* — Henry Gabryjelski; Kate Drakos; Sandip Minhas (57) ABSTRACT

Annotation information associated with entities of a computing system can be added to a forest generated from the entities where the structure of the forest reflects relationships between the entities. Annotations associated with a child node can be propagated to all parent nodes of the child node all the way up to one or more root nodes of the annotated forest. Annotations associated with a child node can be propagated to a specified depth or place or at nodes with one or more particular characteristics or annotations. The propagation can be performed on-demand to all or some subset of nodes. The annotated forest can be analyzed to determine nodes to which a set of conditions apply.

20 Claims, 6 Drawing Sheets

(56) References Cited

OTHER PUBLICATIONS

Hassan, et al., "Predicting Change Propagation in Software Systems", Retrieved at <<http://research.cs.queensu.ca/~ahmed/home/pubs/icsm2004.pdf>>, Proceedings of International Conference on Software Maintenance, Sep. 11, 2004, pp. 10.

"Visualize Code Dependencies on Dependency Graphs", Retrieved at <<http://msdn.microsoft.com/en-us/library/dd409453.aspx>>, Retrieved Date Oct. 9, 2012, pp. 19.

Yang, et al., "MECA: an Extensible, Expressive System and Language for Statically Checking Security Properties", In Proceedings of the 10th ACM conference on Computer and communications security, Oct. 27, 2003, pp. 14.

* cited by examiner

ANALYSIS OF PROPAGATED INFORMATION USING ANNOTATED FORESTS

BACKGROUND

In computing, a function is a segment of source code that performs a task. A function that calls another function is a caller or calling function. A function that is called by another function is a callee function. A call graph is a directed graph that represents calling relationships between callers and callees in a computer program. Each node in the call graph represents a function and each edge indicates a caller and a callee. For example, an edge (a,b) indicates that function a calls function b. Call graphs can be used for program analysis. For example, a call graph can be used to provide a visual that helps humans understand how a program works. Call graphs are typically used to detect errors in program execution. A forest is a directed graph comprised of a disjoint union of trees.

SUMMARY

An annotated forest representing relationships between entities of a computing system can be analyzed to determine the effects of a particular condition or set of conditions on the computing system. An annotated forest representing a software system can be analyzed to determine the effects of a particular condition or set of conditions on the software system. Segments of program code of a software system can be annotated in the source code. A segment of program code can be a function or a block of code that has a particular capability or dependency, a data type or other code segment. A forest can be created directly or indirectly from the source code, wherein relationships between code segments are represented by parent and child nodes. Annotations associated with a child node can be propagated to its immediate parent and to all parents of the immediate parent and so on potentially all the way up to one or more root nodes of the annotated forest. Annotations associated with a child node can be repeatedly propagated to a parent node to a specified depth or place or at nodes with one or more particular characteristics or annotations. The propagation can be performed on-demand to all or some subset of nodes.

A call forest representing relationships between segments of code of a software system where the segments of code are functions, can be created directly or indirectly from annotated source code. The call forest can represent multiple independent programs each of which is represented by a call tree. One or more annotations associated with a node representing a callee function represented by a child node can be associated with the node representing a caller function that calls the callee function, represented by a parent node of the child node. The one or more annotations associated with the caller function that calls the callee function can be associated with functions that call the caller function and so on potentially all the way up to one or more root nodes of the annotated call forest. The one or more annotations associated with the caller function that calls the callee function can be associated with functions that call the caller function to a specified depth or place or at nodes with one or more particular characteristics or annotations. The propagation can be performed on-demand to all or some subset of nodes. The annotated call forest can be analyzed by traversing the annotated call forest to determine how many functions call a callee function, which functions call a callee, entry points to access a particular function and so on. The analysis information can be provided in a tangible form such as but not limited to a list of functions, entry points, protocols, etc. which can be displayed on a screen, provided in a printed report, etc.

A call forest representing relationships between segments of codes that are functions can be created directly or indirectly from one or more annotation files that associates callee functions with one or more annotations. The one or more annotations associated with a callee function in the annotation file(s) can be associated with the node in the call forest representing the callee function. The one or more annotations can be associated with a caller function that calls the callee function. The one or more annotations associated with the caller function that calls the callee function can be associated with functions that call the caller function and so on all the way up to one or more root nodes of the annotated call forest or to a specified depth or place or at nodes with one or more particular characteristics or annotations. The propagation can be performed on-demand to all or some subset of nodes.

An annotated forest comprising a collection of message trees can be created. A message tree can represent a message and the derivation of the message. For example, a message tree can be created from an HTTP (HyperText Transfer Protocol) message extracted from one or more TCP (Transmission Control Protocol) messages extracted from one or more IP (Internet Protocol) messages extracted from one or more Ethernet packets in a messaging system. A forest can be created from the one or more message trees representing the messaging system. Nodes in the forest can be associated with annotations comprising information including but not limited to error messages to create an annotated forest. One or more annotations associated with a child node can be propagated up the annotated forest to the immediate parent nodes, and to parent nodes of those nodes and so on potentially all the way up to one or more root nodes of the annotated forest or to a specified depth or place or at nodes with one or more particular characteristics or annotations. The propagation can be performed on-demand to all or some subset of nodes.

A forest comprising a collection of object and/or sub-object trees for a software system can be created. An object tree can represent an object and objects or sub-objects derived from the object. An object forest comprising a collection of objects and/or sub-objects for a software system can be created. An object forest can comprise a collection of object trees representing relationships between the objects and sub-objects in a software system. Nodes in the forest can be associated with annotations comprising information about the object that is to be tracked or correlated such as, but not limited to, errors, usage patterns, particular conditions, requirements, security concerns, etc. One or more annotations associated with a child node can be propagated up the annotated forest to the immediate parent nodes, and to parent nodes of those nodes and so on potentially all the way up to one or more root nodes of the annotated forest or to a specified depth or place or at nodes with one or more particular characteristics or annotations. The propagation can be performed on-demand to all or some subset of nodes.

A forest comprising a collection of type trees for a software system can be created. A type tree can represent a type and subtypes derived from the type. A type forest comprising a collection of types for a software system can be created. A type forest can comprise a collection of type trees representing relationships between all the types and subtypes in a software system. Nodes in the forest can be associated with annotations comprising information about the type that is to be tracked or correlated such as, but not limited to: errors, usage patterns, particular conditions, requirements, security concerns, etc. One or more annotations associated with a child node can be propagated up the forest to the immediate parent nodes, and to parent nodes of those nodes and so on potentially all the way up to one or more root nodes of the annotated forest or to a specified depth or place or at nodes with one or more particular characteristics or annotations. The propagation can be performed on-demand to all or some subset of nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Historically, annotations in the form of comments were used for code documentation and were ignored when the code was compiled or executed. Today the use of annotations has been expanded. Various tools are available to insert annotations into code. Tools are available that use annotations to add features to an application. For example, there are annotations that are used by tools to allow objects to be stored in a database, to cache objects or to enable multi-threading behavior in executing code.

The subject matter described herein provides the ability to create and analyze an annotated forest to determine the effect of a particular trigger or condition or set of triggers or conditions on a computing system. Suppose for example, someone wants to identify all protocols in use by a particular software system. Functions that invoke a protocol can be identified and annotated with a protocol identifier or other annotation. Annotations can be associated with the function either by annotating the function in the source code or by creating a separate file that maps functions to annotations. Annotations can be performed manually or by using an annotation tool. Function dependencies can be obtained by inspection of metadata generated by a build, by other means known in the art or by a combination thereof. A call forest of calling dependencies can be generated, where, for example, caller functions are the parent nodes of callee functions in the call forest.

When a function is associated with annotation information of interest, (e.g., the annotation information indicates that this function employs or is associated with protocol X) the annotation information can be associated with any callers of this function and any callers of those callers all the way up the call forest potentially to one or more root nodes, identifying all functions that could potentially invoke the use of the protocol.

In accordance with aspects of the subject matter disclosed herein, annotations are added to source code elements such as functions, static data or other code segments or in text or binary data that can be manipulated by a program (e.g., HTML, XML, etc.). Annotations can be added either manually or by a programming tool. A forest can be created that captures the relationships between the code elements. For example, a call forest that represents a relationship in which a function a is called by a function b can be a tree in which the caller function b is a parent node of the callee function a. If the callee function a is associated with particular annotation information A, that annotation information A can be associated with caller function b. Moreover, annotation information A can also be associated with any functions that call caller function b, all the way up the call forest to one or more root nodes of the call forest or to a specified depth or place or at nodes with one or more particular characteristics or annotations. For example, propagation may be limited to an API boundary or security boundary. The propagation can be performed on-demand to all or some subset of nodes. Analysis of annotated functions within the call forest can provide information including but not limited to knowing how many functions in the system are related to a particular annotation, etc.

In accordance with aspects of the subject matter disclosed herein, annotations can be added to nodes in a forest, the forest capturing the nature of one or more relationships between whatever the nodes represent. For example, relationships represented in a forest can be a caller-callee relationship and a derivation relationship. For example, suppose type A represented by a parent node is derived from type B, a child node. Suppose annotation X is associated with type B. Annotation X can be associated with type A. Moreover, annotation X can be associated with any caller of the node representing type A or any caller of the node representing type B.

A relationship represented in a forest may be inheritance. An annotated forest may represent a base class and subclasses that inherit from the base class. Annotations associated with one or more nodes in the forest may be attributes, etc. of the base class that are propagated to parent nodes in the annotated forest.

In accordance with aspects of the subject matter disclosed herein, an annotated forest can be created to identify and document all protocols within a software system. An automated tool can create a full call forest of the software system, building a call tree of all functions within the software system. Information to build the call forest can be obtained from the results of build tools including but not limited to layer graphs and/or log files. Functions that are network-related can be determined either manually, by an automated tool or by a combination thereof. Any function that calls into an external network-related function can potentially create another protocol by layering on top of the existing protocol. For example, any function that uses the HTTP protocol can potentially create its own protocol because specific data can be passed.

To identify all users of the HTTP protocol, the code of the function can be inspected. If a new protocol is created, the function can be marked as using a protocol. Thus, network-related functions can be marked or annotated and the annotation can be propagated up the call tree, enabling top level entry points to be found. Points (root nodes of sub-trees) anywhere in the call tree that represent functions that call into a network can be determined by identifying functions that access the network from a low level and marking those functions. By propagating the annotations up the call tree any function that uses any protocol layers above the one used by the marked function can be found. For example, by marking a function that uses the HTTP protocol and propagating that information to all callers of that function, and callers of those callers, etc. any function layered on top of a function that uses the HTTP protocol can be found. Propagation may be limited to a particular type of message such as messages that use the TCP protocol, etc.

In accordance with aspects of the subject matter disclosed herein, a protocol analysis tool can create an annotated forest that can represent a message layering system where messages use different layered protocols. For example, in a messaging system, a communication between entities can be intercepted. A packet can be inspected. Because the packet was an intercepted message, it can be inferred that the IP protocol and the TCP protocol are used. An annotated forest can be created where messages that have errors can be annotated with the information that this packet has an error and potentially with the type of error encountered. Suppose for example that the TCP layer has a checksum error. The checksum error annotation can be propagated up the forest so that if a message using a protocol at a layer above TCP is inspected, it will be apparent that somewhere below, a checksum error was encountered.

For example, suppose a message that requests a website home page is intercepted (e.g., an HTTP GET command) Getting a home page typically results in generation of a number of other HTTP GETs. Each HTTP GET has a corresponding HTTP response. A request could be a request for an image. Images are potentially large so the HTTP response could be spread across multiple TCP segments. Each TCP segment is an independent message having a corresponding IP and Ethernet packet each of which could be further fragmented. Hence, a single HTTP GET and its response can be represented as a forest having multiple calls with multiple layers. Suppose that one of the TCP messages associated with the image request is associated with a checksum error. The node in the forest can be annotated to indicate that that node has a checksum error. If an annotated forest representing the web request is displayed to a user, the user can expand the node representing the image request and see all the requests beneath it, and see any requests that have the checksum error. Any node in the tree can represent the sub-tree of nodes having checksum errors. Thus for a website having multiple pages, the pages associated with errors can be identified.

An annotated forest can be used to find sub-trees with errors or to find sub-trees associated with any trigger condition or a set of trigger conditions. For example, suppose an annotated forest is created where nodes for messages using HTTP and nodes for messages using TCP annotated, and the HTTP and TCP annotations are propagated up the forest. Any sub-tree can be inspected to determine what protocols are used anywhere beneath the node representing the root node of the sub-tree. Any entity calling into an annotated node can be determined. More than one condition can be of interest. The annotated forest enables combinations of triggering conditions to be found. For example, the root node of a sub-tree that has a specified set of conditions can be found by traversing the annotated forest and keeping track of the annotations encountered.

An annotated forest can be used to find trees and/or sub-trees in which a particular annotation or set of annotations associated with an object or set of objects and/or derived object or set of derived objects can be found. An annotated forest can be used to find trees and/or sub-trees in which a particular annotation or set of annotations associated with a type or set of types and/or a derived type and/or set of derived types can be found.

Analysis of Propagated Information Using Annotated Forests

Figure 1A:
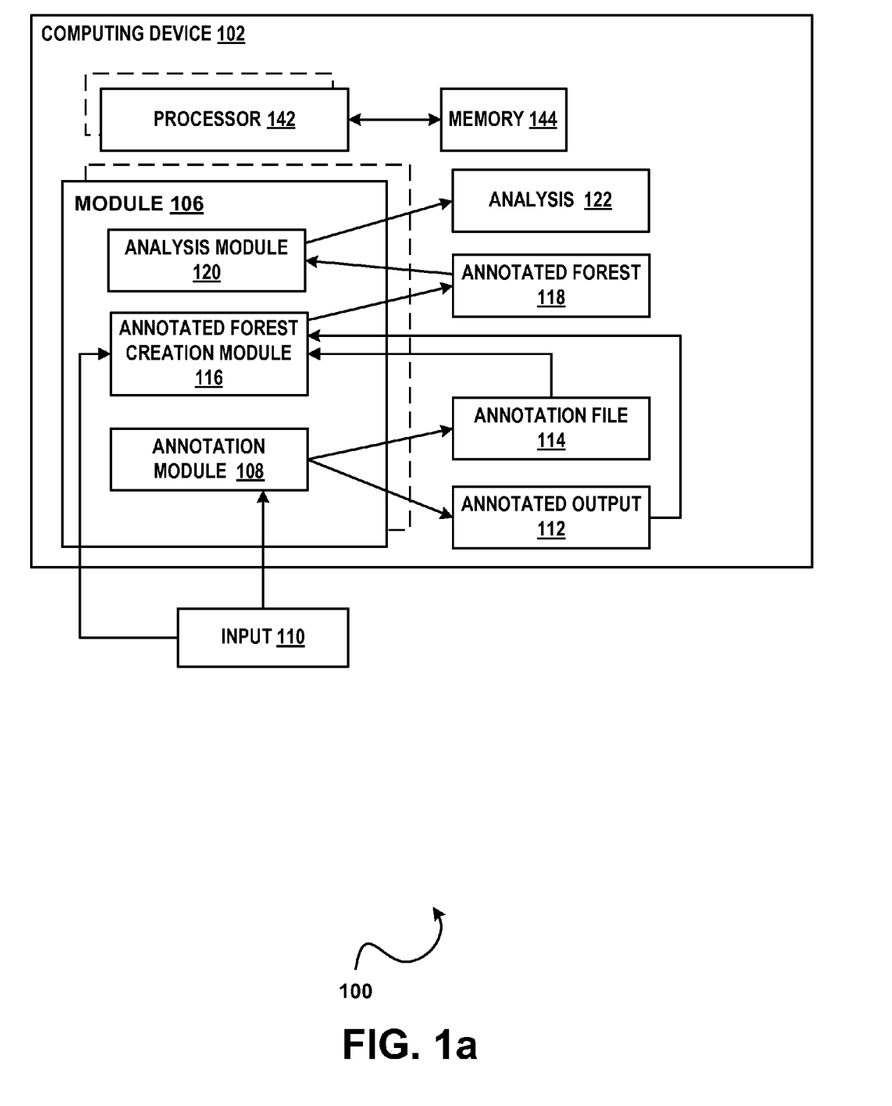
FIG. 1a illustrates an example of a system 100 that creates and/or analyzes an annotated forest in accordance with aspects of the subject matter described herein.

FIG. 1a illustrates a block diagram of an example of a system 100 in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 may execute in whole or in part on a software development computer such as the software development computer described with respect to FIG. 4. All or portions of system 100 may be operated upon by development tools. For example, all or portions of system 100 may execute within an integrated development environment (IDE) such as for example the IDE described more fully with respect to FIG. 4. System 100 can execute wholly or partially outside an IDE.

System 100 can include one or more of: one or more computing devices such as computing device 102, one or more processors such as processor 142, etc., a memory such as memory 144 connected to the one or more processors and one or more modules that create and/or analyze an annotated forest as described herein. The one or more modules that create and/or analyze the annotated forest, when loaded into memory, can cause the one or more processors to perform one or more of the following: annotate elements of a computing system, create an annotated forest and analyze the annotated forest as described herein. For ease of understanding, system 100 is described within the context of program code. It will be appreciated however, that system 100 is not limited to analysis of program code. The concepts described herein apply to any entities within any computing system.

The one or more modules (e.g., module 106) that create and/or analyze the annotated forest may include an annotation module such as annotation module 108 that receives input such as input 110 and annotates all or portions of the input. Input can be program source code, program executable code, binaries, libraries, messages in a messaging system, text such as HTML or XML that is acted upon by a program, etc. Annotation module 108 can annotate all or portions of the input. For example, a portion or segment of source program code acted upon by annotation module 108 can be a function, a block of code, (e.g., a block of code having a particular capability or dependency, derivation, or input), a data type, text that will be acted upon by a program and so on. Annotation module 108 can be an automated programming tool or can be an editor in which annotations are made manually by a user such as a developer. Annotation module 108 can generate annotated output such as annotated output 112. Annotated output 112 can be annotated program code, annotated messages, or any kind of annotated output. Annotation module 108 can create a separate file such as annotation file 114 associated with the input 110. For example, annotation module 108 can create one or more annotation files associated with program code for a software system, an annotation file or files mapping functions or other blocks of code to one or more particular annotations. Annotations can be associated with a subject of interest such as but not limited to protocols, errors, attributes and so on.

The one or more modules (e.g., module 106) that create and/or analyze the annotated forest may include an annotated forest creation module such as annotated forest creation module 116. A forest created by annotated forest creation module 116 can be a call forest that represents caller-callee relationships between functions. A forest created by annotated forest creation module 116 can be a forest that represents inheritance of objects or data types. In computing inheritance can be used to reuse code of existing objects and/or can be used to establish a derived object from an existing object. When objects are defined by classes, classes can inherit attributes and behavior from pre-existing base classes, superclasses, parent classes or ancestor classes. Classes resulting from the use of inheritance are sometimes called derived classes, subclasses or child classes. For example, if an object B is derived from an object A, a particular type of edge from B to A can exist that enables an annotation associated with object A to be associated with derived object B. Similarly, a type forest can be created in which annotations associated with a type can be associated with all derived types.

Annotated forest creation module 116 may receive input 110 or some derivative of input 110 and one or more annotation files such as annotation file 114 and can generate an annotated forest such as annotated forest 118 therefrom. Annotated forest creation module 116 may receive annotated output such as annotated output 112 and create therefrom directly or indirectly annotated forest 118. Annotated forest creation module 116 can annotate each parent node with annotation information from each of its child nodes and propagate this information up the forest to one or more root nodes to create an annotated forest such as annotated forest 118. Annotated forest creation module 116 can annotate each parent node with annotation information from each of its child nodes and propagate this information up the forest to one or more root nodes or to a specified depth or place or at nodes with one or more particular characteristics or annotations. The propagation can be performed on-demand to all or some subset of nodes. Annotated forest 118 can be cyclic. In accordance with aspects of the subject matter described herein, annotated forest 118 may represent a computing system comprising a software system, a messaging system, or any other type of computing system. Annotated forest 118 may comprise a call forest that represents callees and callers of functions or other code segments. Annotated forest 118 may represent messages in a messaging system where an interior or leaf node represents an HTTP get command and the parent nodes of the HTTP get command node are messages that are generated in response to the HTTP get command. Annotations associated with the messages in the messaging system may represent messaging error messages. An annotated forest created by annotated forest creation module 124 can be an annotated forest that represents inheritance of objects or data types. Annotated forest 118 may represent one or more relationships between whatever the nodes of the annotated forest 118 represent.

The annotated forest creation module 116 can annotate one or more child nodes with annotation information. The annotated forest creation module 116 can associate the annotation information with the immediate parent or parents of the annotated child node(s). The annotated forest creation module 116 can repeat this process repeatedly until one or more root nodes of the forest are reached, thus propagating the annotation information up the forest to one or more root nodes to create an annotated forest such as annotated forest 118. Annotated forest creation module 116 can annotate each parent node with annotation information from each of its child nodes and propagate this information up the forest to a specified depth or place or at nodes with one or more particular characteristics or annotations. The propagation can be performed on-demand to all or some subset of nodes. The one or more modules (e.g., module 106) that create and/or analyze the annotated forest may include an analysis module such as analysis module 120 that traverses annotated forest 118 and creates analysis 122. Analysis 122 can be displayed on a display device or printed, saved or otherwise be processed to provide tangible and/or human readable results.

Figure 1B:
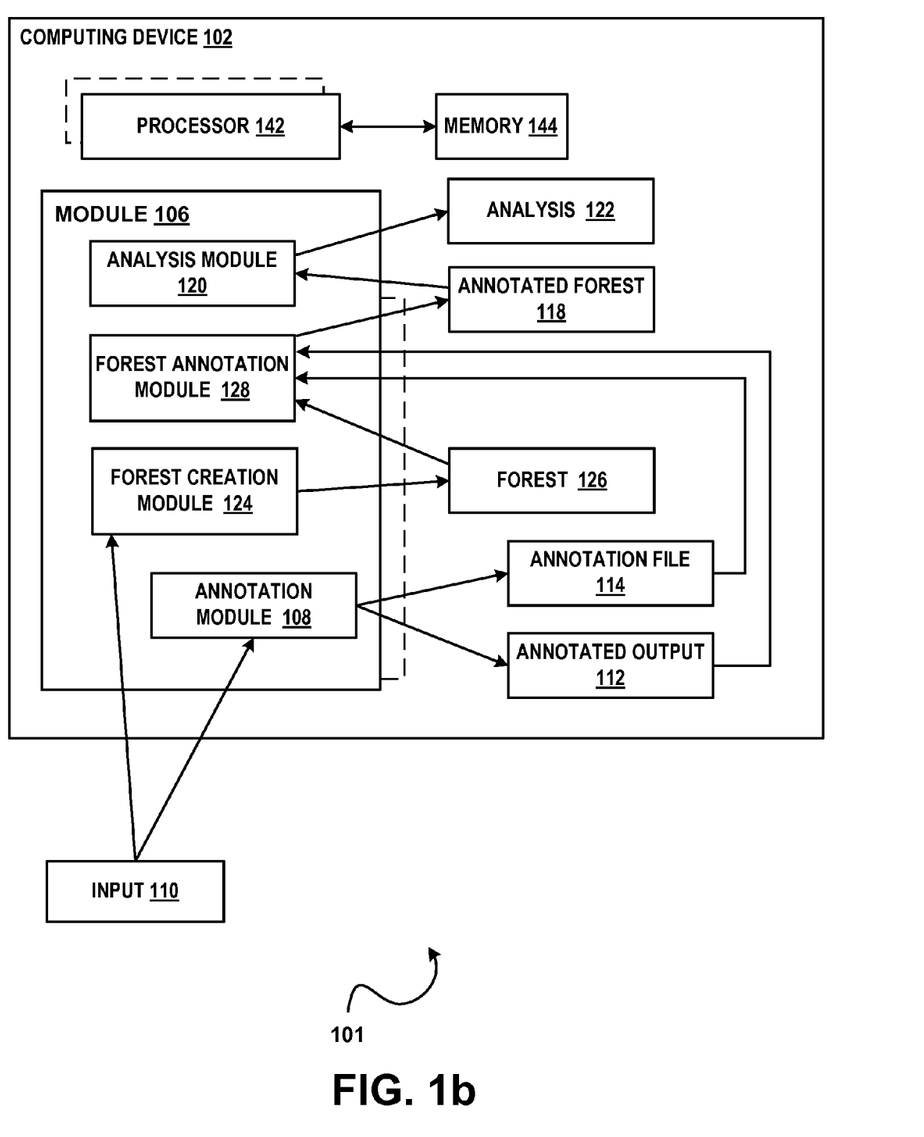
FIG. 1b illustrates another example of a system 101 that creates and/or analyzes an annotated forest in accordance with aspects of the subject matter described herein.

In accordance with aspects of the subject matter described herein, FIG. 1b illustrates another example of a system 101 that creates and/or analyzes an annotated forest. All or portions of system 101 may reside on one or more computers or computing devices such as the computers described below with respect to FIG. 3. System 101 or portions thereof may be provided as a stand-alone system or as a plug-in or add-in. System 101 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 101 may execute in whole or in part on a software development computer such as the software development computer described with respect to FIG. 4. All or portions of system 100 may be operated upon by development tools. For example, all or portions of system 101 may execute within an integrated development environment (IDE) such as for example the IDE described more fully with respect to FIG. 4. System 101 can execute wholly or partially outside an IDE.

System 101 can include one or more of: one or more computing devices such as computing device 102, one or more processors such as processor 142, etc., a memory such as memory 144 connected to the one or more processors and one or more modules that create and/or analyze an annotated forest as described herein. The one or more modules that create and/or analyze the annotated forest, when loaded into memory, can cause the one or more processors to perform one or more of the following: annotate elements of a computing system, create an annotated forest and analyze the annotated forest as described herein.

The one or more modules (e.g., module 106) that create and/or analyze the annotated forest may include an annotation module such as annotation module 108 that receives input such as input 110 and annotates all or portions of the input. Input can be program source code, program executable code, binaries, libraries, messages in a messaging system, text such as HTML or XML that is acted upon by a program, etc. Annotation module 108 can annotate all or portions of the input. For example, a portion or segment of source program code acted upon by annotation module 108 can be a function, a block of code, (e.g., a block of code having a particular capability or dependency, derivation, or input), a data type, text that will be acted upon by a program and so on. Annotation module 108 can be an automated programming tool or can be an editor in which annotations are made manually by a user such as a developer. Annotation module 108 can generate annotated output such as annotated output 112. Annotated output 112 can be annotated program code, annotated messages, or any kind of annotated output. Annotation module 108 can create a separate file such as annotation file 114 associated with the input 110. For example, annotation module 108 can create an annotation file associated with program code for a software system, the annotation file mapping functions or other blocks of code to one or more particular annotations.

The one or more modules (e.g., module 106) that create and/or analyze the annotated forest may include a forest creation module such as annotated forest creation module 124. Annotated forest creation module 124 may receive input 110 or some derivative of input 110 and can generate a forest such as forest 126 therefrom. A forest created by annotated forest creation module 124 can be a call forest that represents caller-callee relationships between functions or other blocks of code. A forest created by annotated forest creation module 124 can be a forest that represents inheritance of objects or data types. A forest created by annotated forest creation module 124 can be cyclic. Forest annotation module 128 may receive forest 126 and annotated output such as annotated output 112 and create therefrom directly or indirectly annotated forest 118. Forest annotation module 128 may receive forest 126 and one or more annotation files such as annotation file 114 and may create therefrom directly or indirectly annotated forest 118. Annotated forest 118 can be cyclic.

In accordance with aspects of the subject matter described herein, annotated forest 118 may represent a computing system comprising a software system, a messaging system, or any other type of computing system. Annotated forest 118 may comprise a call forest that represents callees and callers of functions or other code segments. Annotated forest 118 may represent messages in a messaging system where an interior or leaf node represents an HTTP get command and the parent nodes of the HTTP get command node are messages that are generated in response to the HTTP get command. Annotations associated with the messages in the messaging system may represent messaging error messages. An annotated forest created by annotated forest creation module 124 can be an annotated forest that represents inheritance of objects or data types. Annotated forest 118 may represent one or more relationships between whatever the nodes of the annotated forest 118 represent.

Forest annotation module 128 can receive a forest such as forest 126 and may annotate one or more child nodes with annotation information. Forest annotation module 128 can associate the annotation information with the immediate parent or parents of the annotated child node(s). The annotated forest creation module 116 can perform this process repeatedly until one or more root nodes of the forest is reached, thus propagating the annotation information up the forest to one or more root nodes to create an annotated forest such as annotated forest 118. Forest annotation module 128 can annotate each parent node with annotation information from each of its child nodes and propagate this information up the forest or to a specified depth or place or to nodes with one or more particular characteristics or annotations. The propagation can be performed on-demand to all or some subset of nodes. The one or more modules (e.g., module 106) that create and/or analyze the annotated forest may include an analysis module such as analysis module 120 that traverses annotated forest 118 and creates analysis 122. Analysis 122 can be displayed on a display device or printed, saved or otherwise be processed to provide tangible and/or human readable results.

Figure 2A:
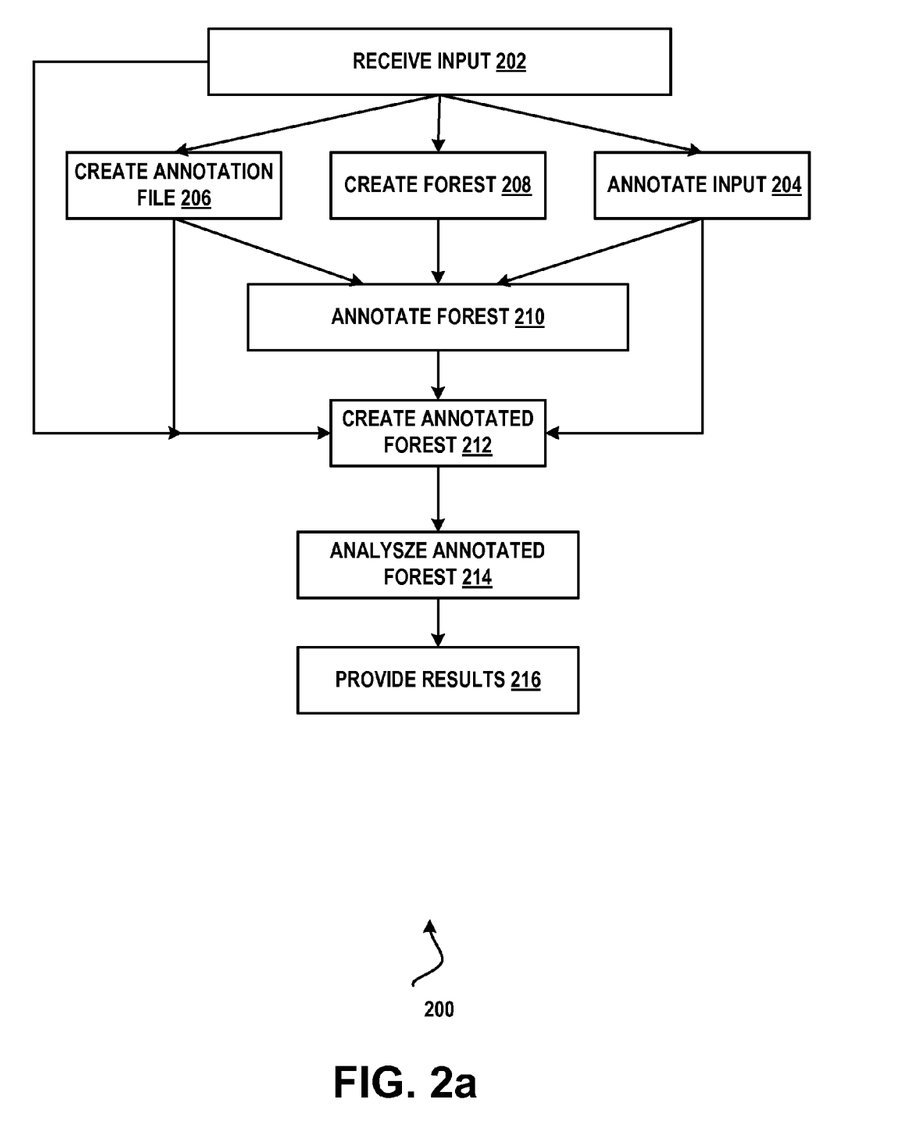
FIG. 2a illustrates an example of a method 200 that analyzes the propagation of information in a software system in accordance with aspects of the subject matter disclosed herein.

FIG. 2a illustrates an example of a method 200 that can create and/or analyze an annotated forest in accordance with aspects of the subject matter described herein. The method described in FIG. 2a can be practiced by a system such as but not limited to the one described with respect to FIG. 1a and/or FIG. 1b. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 input can be received by an annotation module. Input can be program source code, program executable code, binaries, libraries, messages in a messaging system, text such as HTML or XML that is acted upon by a program, etc. At operation 204 an annotation module can annotate all or portions of the input to create annotated output. For example, a portion or segment of source program code acted upon by the annotation module can be a function, a block of code, (e.g., a block of code having a particular capability or dependency or input), a data type, text that will be acted upon by a program and so on. The annotation module can be an automated programming tool or can be an editor in which annotations are made manually by a user such as a developer. The annotation module can generate annotated output such as annotated program code, annotated messages, or any kind of annotated output. At operation 212 a module that creates annotated forests can receive the annotated output created by the annotation module and can create an annotated forest at operation 212 which can be analyzed at operation 214 and for which results can be provided at operation 216.

Alternatively, at operation 202 input can be received by the same or by a different annotation module. Input can be program source code, program executable code, binaries, libraries, messages in a messaging system, text such as HTML or XML that is acted upon by a program, etc. At operation 206 the annotation module can create a separate file such as an annotation file associated with the input. The annotation module can be an automated programming tool or can be an editor in which annotations are made manually by a user such as a developer. The annotation module can generate an annotated file associated with program code for a software system, the annotation file mapping functions to one or more particular annotations. At operation 212 a module that creates annotated forests can receive one or more annotation files and the input and can create an annotated forest which can be analyzed at operation 214 and for which results can be provided at operation 216.

Alternatively, at operation 202 input can be received by a forest creation module that creates a forest from the input at operation 208. The forest and the annotated input can be received by a forest annotation module at 210 and an annotated forest can be created at operation 212 which can be analyzed at operation 214 and for which results can be provided at operation 216. Alternatively, at operation 202 input can be received by a forest creation module that creates a forest from the input at operation 208. The forest and the one or more annotation files can be received by a forest annotation module at 210 and an annotated forest can be created at operation 212 which can be analyzed at operation 214 and for which tangible results can be provided at operation 216.

Figure 2B:
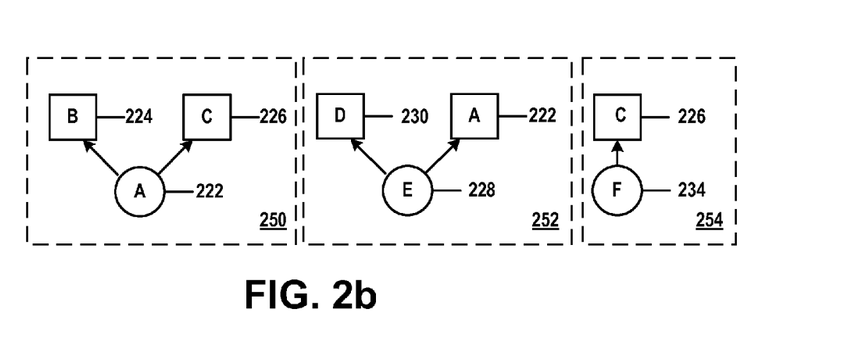
FIG. 2b illustrates examples of callers and callees in accordance with aspects of the subject matter disclosed herein.

FIGS. 2b through 2f illustrate an example of a method to create and analyze annotated forests in accordance with aspects of the subject matter disclosed herein. The independent trees, forests and annotated forests of FIGS. 2b through 2f can represent dependencies between callers and callees, inheritance between objects or types, derivations, messages in a messaging system, caller-callee relationships between blocks of program code, etc. as described more fully above, however, for ease of understanding FIGS. 2b through 2f will be explained in the context of caller and callee functions. FIG. 2b illustrates examples of independent trees. A first example 250 indicates that function A 222 calls function B 224 and function C 226. In FIG. 2b functions shown as circles (e.g., function A 222 in example 250, function E 228 in example 252 and function F 234 in example 254) are caller functions and functions shown as squares (e.g., function B 224 and function C 226 in example 250, function D 230 and function A 222 in example 252 and function C in example 254) are callee functions. It will be appreciated that the same function can be both a callee function and a caller function (e.g., function A 222 is a caller function in example 250 and a callee function in example 252. A second example of a dependency, example 252, indicatess that caller function E 228 calls function D 230 and function A 222. A third dependency, example 254 indicates that caller function F 234 calls callee function C 226.

Figure 2C:
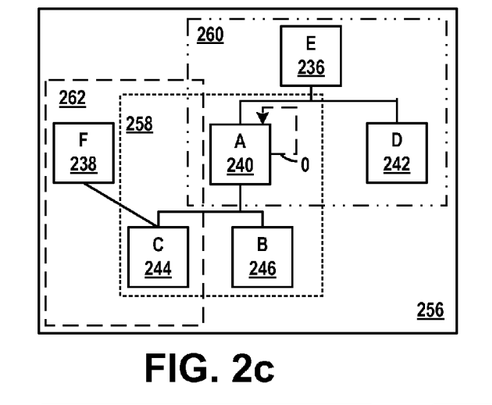
FIG. 2c illustrates an example of a forest 256 created from the examples of FIG. 2b in accordance with aspects of the subject matter disclosed herein.

FIG. 2c illustrates an example of a call forest created from the dependencies of FIG. 2b. Call forest 256 includes three sub-trees, sub-tree 258, sub-tree 260 and sub-tree 262. In sub-tree 258 node A 240 represents function A 222, node B 246 represents function B 224 and node C 244 represents function C 226. Call forest 256 indicates that node A 240 is a parent node of node C 244 and node B 246 representing that function A 222 calls function C 226 and function B 224. In sub-tree 260 node E 236 represents function E 228, node A 240 again represents function A 222 and node D 242 represents function D 230. Call forest 256 indicates that node E 236 is a parent node of node A 240 and node D 242 representing that function E 228 calls function A 222 and function D 230. In sub-tree 262 node F 238 represents function F 234 and node C 244 represents function C 226. Call forest 256 indicates that node F 238 is a parent node of node C 244 representing that function F 234 calls function C 226. It will be appreciated that call forest 256 created from the call trees of FIG. 2b can be cyclic. For example function A 222 may call function A 222, (represented by dashed line 0 from node A 240 to node A 240) or function A 222 may call function B 224 which calls function C 226 which calls function D 230 (not shown).

Figure 2D:
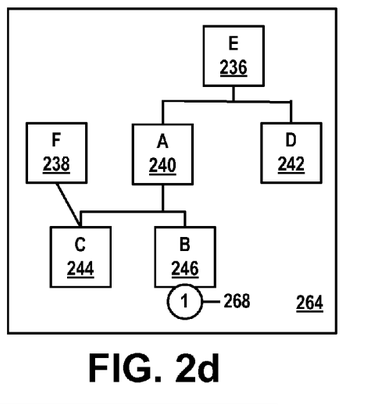
FIG. 2d illustrates an example of an annotated forest 264 created from the forest of FIG. 2c in accordance with aspects of the subject matter disclosed herein.
Figure 2E:
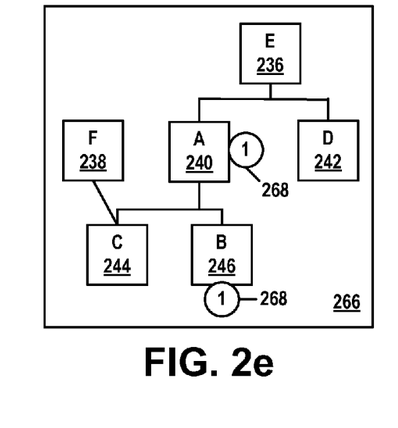
FIG. 2e illustrates another example of an annotated forest 266 created from the annotated forest of FIG. 2d in accordance with aspects of the subject matter disclosed herein.
Figure 2F:
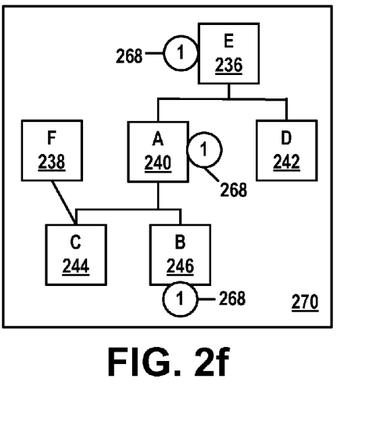
FIG. 2f illustrates another example of an annotated forest 270 created from the annotated forest of FIG. 2e in accordance with aspects of the subject matter disclosed herein.

Suppose that function B 224 is associated with an annotation indicating some condition or trigger of interest. FIG. 2d illustrates the annotated call forest 264 in which the node (i.e., node B 246) representing the callee function B 224 is associated with a corresponding annotation, represented by annotation 1 268 in FIG. 2d. FIG. 2e illustrates the annotated call forest 266 in which the node (i.e., node A 240) corresponding to the function that calls function B 224, function A 222, is also associated with annotation 1 268. FIG. 2f illustrates the annotated call forest 270 in which the node (i.e., node E 236) corresponding to the function that calls function A 222, function E 228, is also associated with annotation 1 268. It is apparent that although a tree of three levels is illustrated, the process of annotating immediate callers of an annotated node can be repeated all the way up a forest of any number of levels to a root node of the annotated call forest. It will also be apparent that annotated call forest 270 can be traversed to determine all the nodes associated with a particular annotation. For example, annotated call forest 270 can be traversed to determine that node E 236 and node A 240 and node B 246 are all associated with annotation 1 268.

Example of a Suitable Computing Environment

Figure 3:
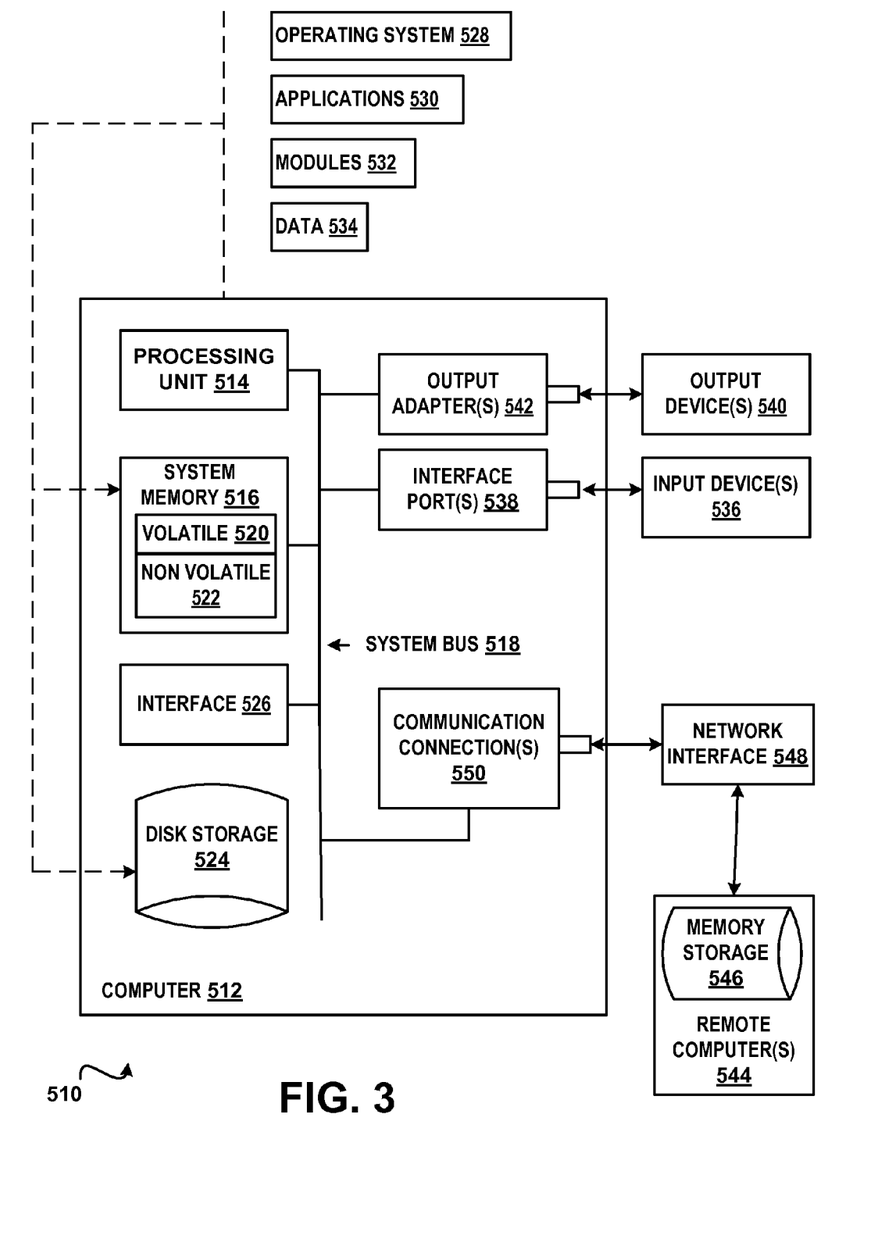
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
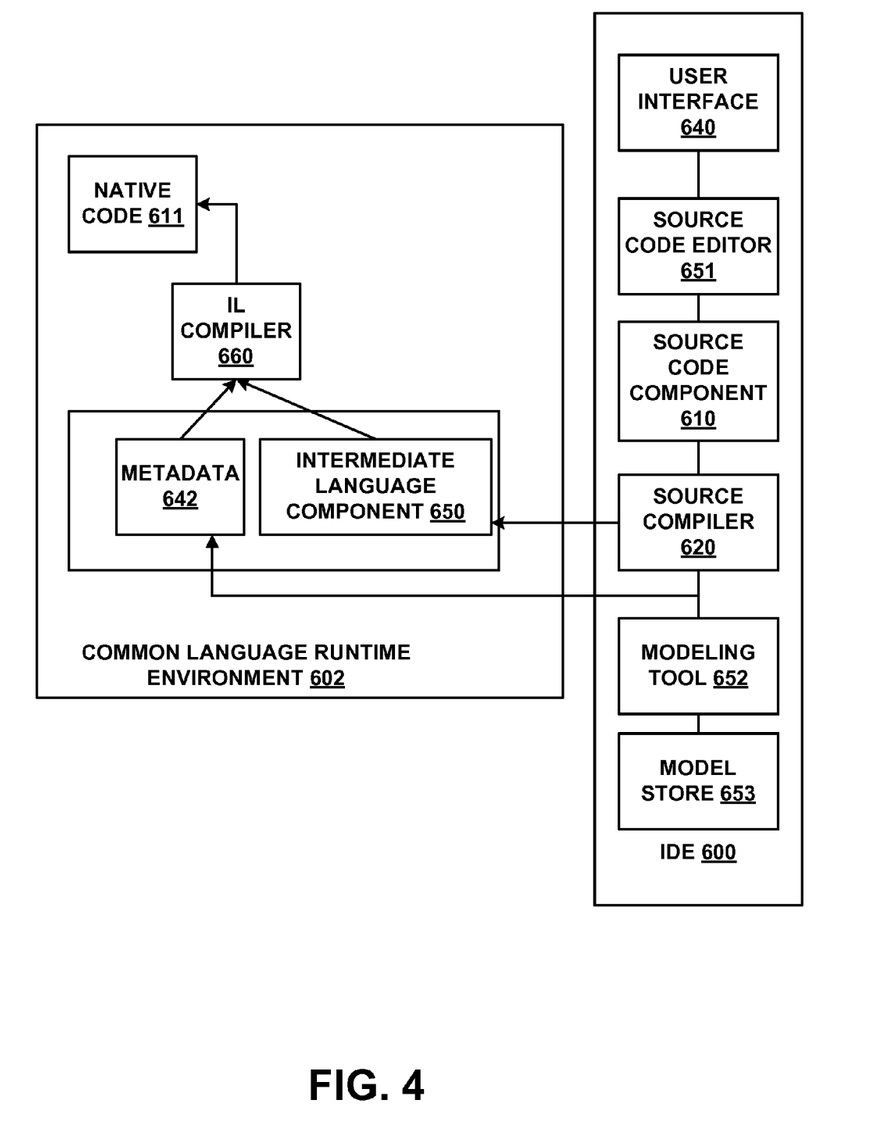
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft. NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
at least one processor;
a memory connected to the at least one processor; and
a module that, when loaded into the at least one processor, causes the at least one processor to:
receive an annotated forest, wherein the annotated forest represents relationships of entities in a computing system, wherein the annotated forest comprises at least one parent node and at least one annotated child node, wherein the at least one annotated child node comprises a child node of the at least one parent node, and wherein the at least one annotated child node is associated with at least one annotation;
associate the at least one annotation to at least one immediate parent node of the at least one annotated child node in the annotated forest; and
repeatedly propagate the at least one annotation of the at least one annotated child node to parent nodes of the at least one annotated child node until a root node of the annotated forest is reached or to a specified depth of the annotated forest or to nodes with at least one particular characteristic or to nodes with at least one particular annotation.

2. The system of claim 1, further comprising:
a module that, when loaded into the at least one processor, causes the at least one processor to:
receive the annotated forest, wherein the annotated forest comprises at least one parent node and at least one child node, and wherein a relationship between the at least one parent node and the at least one child node reflects a relationship between a plurality of code elements in at least one computer program of a software system.

3. The system of claim 2, further comprising:
a module that, when loaded into the at least one processor, causes the at least one processor to:
receive a call forest, wherein the call forest comprises at least one parent node and at least one child node, and wherein at least one relationship between the at least one parent node and the at least one child node represents a caller-callee relationship between a plurality of code elements comprising functions in the at least one computer program of the software system.

4. The system of claim 2, wherein a code element of the plurality of the code elements is an object or a data type, and wherein the at least one annotation comprises an attribute of the object or the data type.

5. The system of claim 2, further comprising:
a module that, when loaded into the at least one processor, causes the at least one processor to:
repeatedly propagate the at least one annotation of the at least one annotated child node to parent nodes of the at least one immediate parent node of the at least one annotated child node to a specified depth or place or nodes with one or more particular characteristics or annotations.

6. The system of claim 2, further comprising:
a module that, when loaded into the at least one processor, causes the at least one processor to:
analyze the annotated forest to determine a set of protocols utilized in a software system; and
provide a list of the set of protocols utilized in the software system.

7. The system of claim 1, further comprising:
a module that, when loaded into the at least one processor, causes the at least one processor to:
repeatedly propagate the at least one annotation of the at least one annotated child node to parent nodes of the at least one immediate parent node of the at least one annotated child node until at least one root node of the annotated forest is reached.

8. The system of claim 1, further comprising:
a module that, when loaded into the at least one processor, causes the at least one processor to:
receive a forest, wherein the forest comprises at least one parent node and at least one child node, wherein the at least one child node comprises a message in a layered messaging system, and wherein the at least one annotation comprises an error associated with the message.

9. The system of claim 1, further comprising:
a module that, when loaded into the at least one processor, causes the at least one processor to:
analyze the annotated forest to determine an effect of a software system of a subject associated with the at least one annotation; and
provide the effect in a tangible form.

10. The system of claim 1, further comprising:
a module that, when loaded into the at least one processor, causes the at least one processor to:
analyze the annotated call forest to find sub-trees of the annotated forest for which a set of trigger conditions apply; and
provide the sub-trees of the annotated forest in a tangible form.

11. The system of claim 1, wherein at least one relationship of a plurality of relationships represented by the annotated forest between the at least one parent node and the at least one annotated child node comprises one of: caller-callee, derivation, dependency, or inheritance.

12. A method comprising:
receiving, by at least one processor of a computing device, an annotated forest, wherein the annotated forest represents relationships of entities in a computing system, wherein the annotated forest comprises at least one parent node and at least one annotated child node, wherein the at least one annotated child node comprises a child node of the at least one parent node, and wherein the at least one annotated child node is associated with at least one annotation;
associating, by the at least one processor of the computing device, the at least one annotation to at least one immediate parent node of the at least one annotated child node in the annotated forest; and
repeatedly propagating, by the at least one processor of the computing device, the at least one annotation of the at least one annotated child node to parent nodes of the at least one annotated child node to create an annotated parent node until a root node of the annotated forest is reached or to a specified depth of the annotated forest or to nodes with at least one particular characteristic or to nodes with at least one particular annotation.

13. The method of claim 12, further comprising:

receiving, by the at least one processor of the computing device, the at least one annotation, wherein the at least one annotation comprises an error message, and wherein the error message is associated with at least one intercepted message in a layered messaging system;

associating, by the at least one processor of the computing device, associate the at least one annotation to at least one node in the annotated forest; and repeatedly propagating, by the at least one processor of the computing device, the at least one annotation of the at least one annotated child node to parent nodes of the at least one annotated child node until a root node of the annotated forest is reached or to a specified depth of the annotated forest or to nodes with at least one particular characteristic or to nodes with at least one particular annotation.

14. The method of claim 13, further comprising:

analyzing, by the at least one processor of the computing device, the annotated forest to determine errors associated with at least one message of a plurality of messages in the layered messaging system; and providing, by the at least one processor of the computing device, a list of messages with errors in a tangible form.

15. The method of claim 12, wherein nodes in the annotated forest comprise code elements, and wherein a code element comprises one of: a callee function or a caller function, a data type or a derived data type, and an object or a derived object.

16. The method of claim 12, further comprising:

analyzing, by the at least one processor of the computing device, the annotated forest to find sub-trees for which a set of trigger conditions apply; and providing, by the at least one processor of the computing device, a list of root nodes of the sub-trees for which the set of trigger conditions apply in a tangible form.

17. A computer-readable storage medium, excluding signals, storing computer-executable instructions, which when executed by at least one processor of a computing device, cause the at least one processor of the computing device to:

receive an annotated forest, wherein the annotated forest represents relationships of entities in a computing system, wherein the annotated forest comprises at least one parent node and at least one child node, wherein the at least one child node comprises a child node of the at least one parent node, wherein the at least one child node is associated with at least one annotation, and wherein the at least one child node comprises an annotated node;

associate the at least one annotation to at least one immediate parent node of the at least one annotated child node in the annotated forest; and repeatedly propagate the at least one annotation of the at least one annotated child node to parent nodes of the at least one annotated child node until a root node of the annotated forest is reached or to a specified depth of the annotated forest or to nodes with at least one particular characteristic or to nodes with at least one particular annotation.

18. The computer-readable storage medium of claim 17, further comprising computer-executable instructions, which when executed by the at least one processor of the computing device, cause the at least one processor of the computing device to:

receive an annotated forest representing relationships between callee functions and caller functions in a software system, wherein the at least one annotation comprises at least one protocol used by the callee functions and the caller functions in the software system.

19. The computer-readable storage medium of claim 17, further comprising computer-executable instructions, which when executed by the at least one processor of the computing device, cause the at least one processor of the computing device to:

receive an annotated forest representing inheritance relationships between objects or data types in a software system, wherein the at least one annotation comprises at least one attribute or at least one error.

20. The computer-readable storage medium of claim 17, further comprising computer-executable instructions, which when executed by the at least one processor of the computing device, cause the at least one processor of the computing device to:

analyze the annotated forest to determine effects of at least one subject associated with the at least one annotation; and provide an analysis of the effects in a tangible form.

* * * * *